United States Patent [19]

Miller

[11] 4,123,666
[45] Oct. 31, 1978

[54] RIM-TYPE HYDROELECTRIC MACHINE

[75] Inventor: Helmut Miller, Niederrohrdorf, Switzerland

[73] Assignee: Escher Wyss Limited, Zurich, Switzerland

[21] Appl. No.: 744,244

[22] Filed: Nov. 23, 1976

[30] Foreign Application Priority Data

Dec. 2, 1975 [CH] Switzerland .................. 15608/75

[51] Int. Cl.² ............... F01D 17/04; F16C 27/00; H02K 7/08
[52] U.S. Cl. .......................... 290/52; 308/9; 308/173; 417/356; 415/110; 415/170 R; 415/500
[58] Field of Search ............... 308/9, 22, 73, 122; 415/107, 110, 172 R, 142, 133, 500, 170 R, 172 A; 417/429, 356, 355; 290/52

[56] References Cited

U.S. PATENT DOCUMENTS

| 3,606,568 | 9/1971 | Braikevitch et al. | 277/74 X |
| 3,644,053 | 2/1972 | Braikevitch et al. | 308/9 X |
| 3,738,717 | 6/1973 | Gardner | 308/122 |
| 3,778,182 | 12/1973 | Hohn et al. | 308/9 X |

FOREIGN PATENT DOCUMENTS

| 1,049,320 | 1/1959 | Fed. Rep. of Germany | 290/52 |
| 732,492 | 3/1943 | Fed. Rep. of Germany | 417/356 |
| 347,253 | 8/1960 | Switzerland | 290/52 |

Primary Examiner—Robert B. Reeves
Assistant Examiner—Edward M. Wacyra
Attorney, Agent, or Firm—Robert A. Ostmann

[57] ABSTRACT

The disclosure concerns a hydroelectric machine including a tube-type hydraulic machine having a bladed wheel which rotates about a horizontal axis and is provided with fixed blades which are encircled by, and connected with, a rim to which the rotor of a surrounding electrical machine is attached. The wheel, rim and rotor form a single rotating unit which is supported in the radial direction without physical contact by at least two hydrostatic centering supporting devices and at least one hydrostatic damping device. At least one hydrostatic load-beaing device may be included for accepting without physical contact a constant portion of the weight of the rotating unit. In addition, the machine may include hydrostatic supporting devices, of the centering type or of both the centering and the damping type, for accepting without physical contact the axial thrusts imposed on the rotating unit.

15 Claims, 12 Drawing Figures

Fig. 6
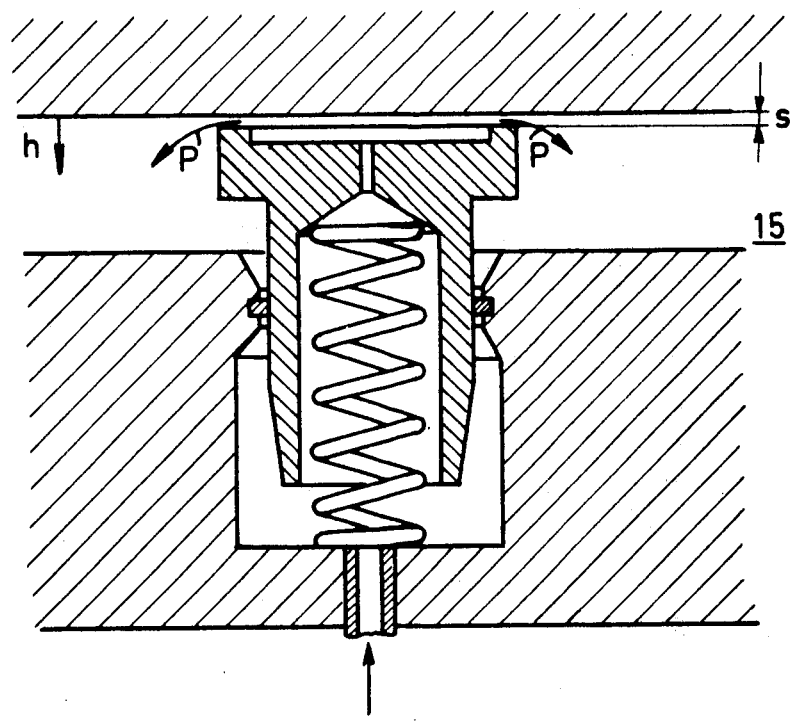
15
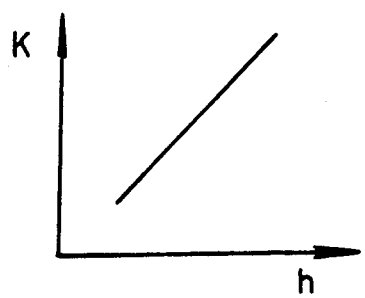
Fig. 6a

18

Fig. 8
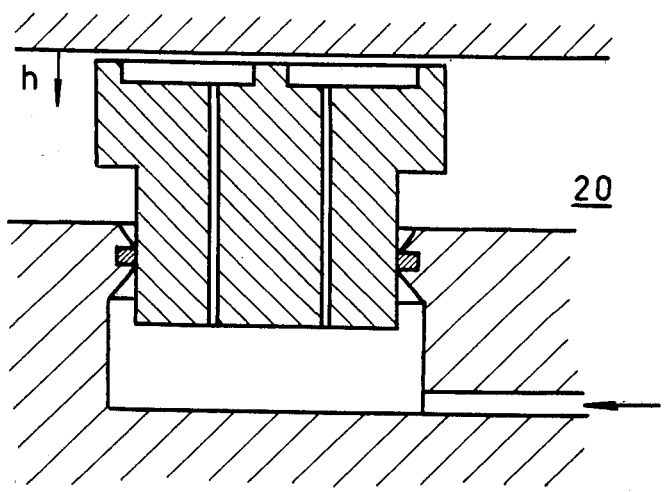
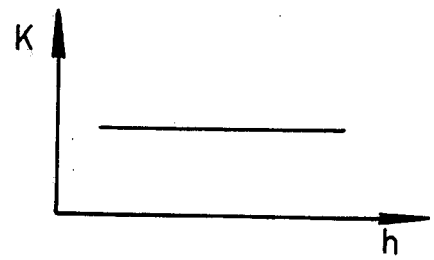
Fig. 8a

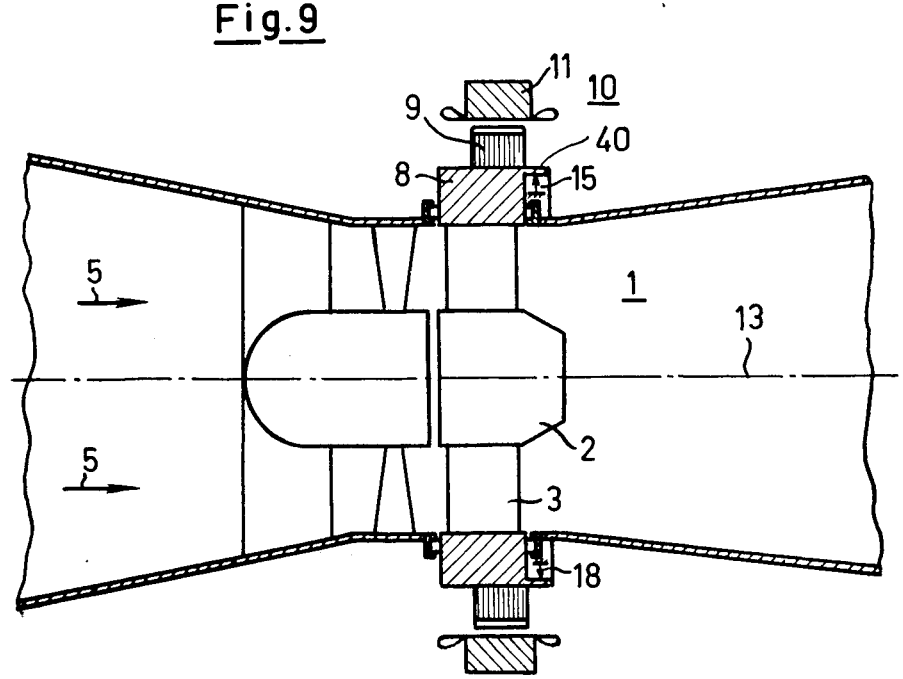

RIM-TYPE HYDROELECTRIC MACHINE

BACKGROUND OF THE INVENTION

This invention relates to a hydroelectric machine including a tube-type hydraulic turbine or pump having a bladed wheel which rotates about a horizontal axis and whose blades are encircled by, and secured to, a rim to which the rotor of a surrounding electrical machine is attached.

Swiss Pat. No. 347,253 discloses a machine of this type in which the blades are adjustable, and the rotating unit consisting of the rim and rotor is mounted by means of a running drum which is secured on the rim and is supported by circumferentially spaced, plain bearing segments. This kind of bearing arrangement is difficult to manufacture precisely, with the necessary tolerances, in cases where the diameter of the running drum may be quite large, for example, 2 to 12 meters. With such a large diameter, the unavoidable deformation of the rim attributable to dead weight, centrifugal forces and temperature changes must also be taken into account. Moreover, the high peripheral speeds at the rim (e.g. 150 meters per second) must be accommodated. In addition, this bearing arrangement is difficult to assemble.

German Pat. No. 676,483 discloses a machine of the type first mentioned in which the bladed wheel employs fixed blades. In this case, the bladed wheel and rim are mounted to rotate on a stub shaft which is secured to the guide blade lattice hub, and this hub, in turn, is connected with the surrounding tubular housing through the guide blades. This bearing scheme obviously is not suitable for machines in which the rim has a diameter on the order of 2 to 12 meters.

SUMMARY OF THE INVENTION

The object of this invention is to provide an improved hydroelectric machine of the type under discussion which employs a bladed wheel having fixed blades, and wherein the rotating unit comprising the rotor, rim and bladed wheel is supported by a bearing arrangement which is simple to construct and assemble and is reliable in operation. According to the invention, the rotating unit of the machine is supported radially without physical contact by a basic arrangement including two sets of hydrostatic devices which include displaceable supporting pistons. The first set comprises at least two hydrostatic supporting devices of the centering type, i.e., a device which furnishes a supporting force which increases and decreases, respectively, as the rotating unit approaches and retreats. These centering devices are located at one side of the horizontal plane containing the axis of rotation and are positioned symmetrically with respect to the vertical plane containing that axis. Moreover, these centering supporting devices are inclined with respect to that vertical plane at an angle which is less than about 60° (i.e., the angle of inclination of each device is not greater than 40°-70° ). The second set of the basic arrangement includes at least one hydrostatic supporting device of the damping type, i.e., a device which normally supplies a constant, relatively small supporting force, but furnishes a much larger supporting force when it is approached rapidly by the rotating unit. The damping supporting device is located at the opposite side of said horizontal plane and is arranged so that its supporting force is directed oppositely to the resultant of the supporting forces furnished by the centering supporting devices.

The centering devices serve as the essential bearings for the rotating unit. Therefore, since they support without physical contact, and their pistons can easily follow deformations of the rotating unit, wear of the relatively moving parts is minimized. Furthermore, since this type of bearing is not subjected to constraining forces resulting from temperature changes, the arrangement need not include the expensive constructional measures required to accept such loads. The damping device, on the other hand, provides reliable support in the event of sudden movements caused by the dynamic forces which occur during starting or stopping of the machine, and thus prevents the development of destructive or excessive forces in the machine components, particularly the bearings. Another important advantage of the new support arrangement is that it makes unnecessary the inclusing of a rotating shaft for the bladed wheel.

According to a further feature of the invention, the radial support arrangement also includes at least one hydrostatic load-bearing device which is located in the vertical central plane and which accepts without physical contact a constant fraction of the weight of the rotating unit. This feature is important in cases where the machine is very heavy and the space available for the centering devices is limited, because the load-bearing device relieves the centering devices of some of the load they otherwise would have to carry.

According to a further development of the invention, the axial thrusts acting on the rotating unit also are accepted hydrostatically. In this version of the invention, at least two, circumferentially spaced hydrostatic centering devices act on the rotating unit at its low pressure side and furnish, without physical contact, the required reaction to the axial thrusts which occur during normal operation. If desired, the reverse axial thrusts which can occur when the machine is stopped may also be accepted, again without physical contact, by at least two circumferentially spaced hydrostatic damping supporting devices which are arranged to act on what normally is the high pressure side of the rotating unit.

BRIEF DESCRIPTION OF THE DRAWINGS

Several constructional examples of the invention are described herein in detail with reference to the accompanying drawings, which contain simplified diagrammatic illustrations, and in which:

FIG. 6 is a sectional view of a hydrostatic centering supporting device.

FIG. 6a is the force vs. travel diagram for the supporting device of FIG. 6.

FIG. 8 is a sectional view of a hydrostatic loadbearing device.

FIG. 8a is the force vs. travel diagram for the device of FIG. 8.

FIG. 9 is an axial sectional view of another version of the improved hydroelectric machine.

DESCRIPTION OF ILLUSTRATED EMBODIMENTS

Figure 1:
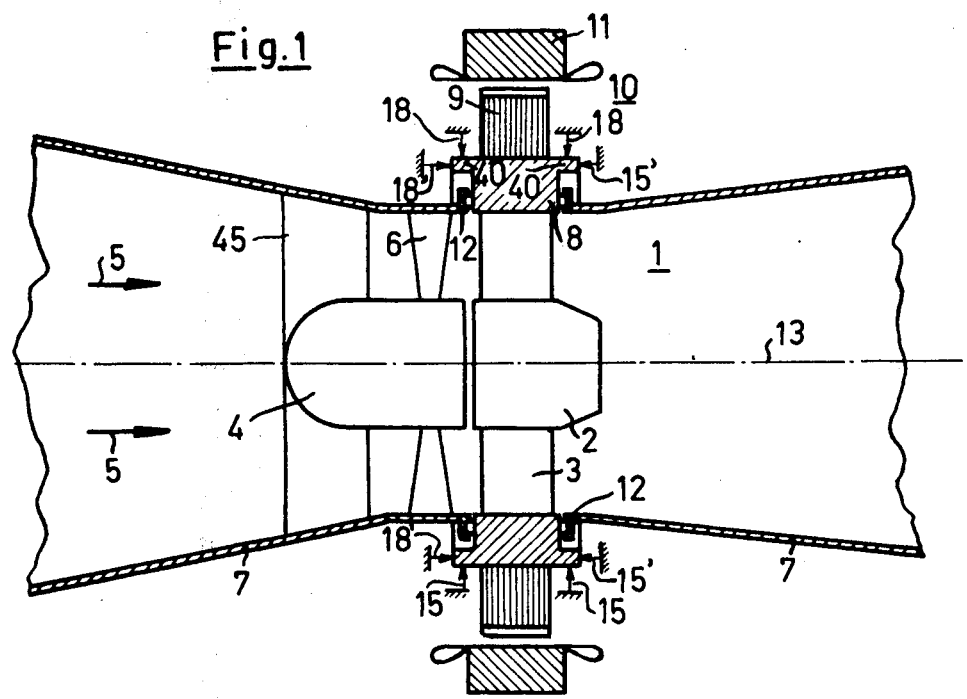
FIG. 1 is an axial sectional view of one version of the improved hydroelectric machine.

Referring to FIG. 1, the improved hydroelectric machine comprises a tube-type turbine 1 which includes a bladed wheel 2 which is provided with fixed blades 3 and is mounted to rotate about a horizontal axis 13, and a central incident flow control element 4 which is located in the direction of flow of the water (see arrows 5) upstream of the hub of the bladed wheel. Incident flow control element 4 is secured to the tubular housing 7 by radial partition walls 45 which extend in the direction of flow and carries guide blades 6. Bladed wheel 2 is surrounded externally by a rim 8, which is connected with blades 3, and on which is secured the rotor 9 of an electrical generator 10. This rotor 9, in turn, is surrounded by the stator 11 of generator 10. Suitable sealing elements 12 are interposed between tubular housing 7 and rim 8.

Figure 3:
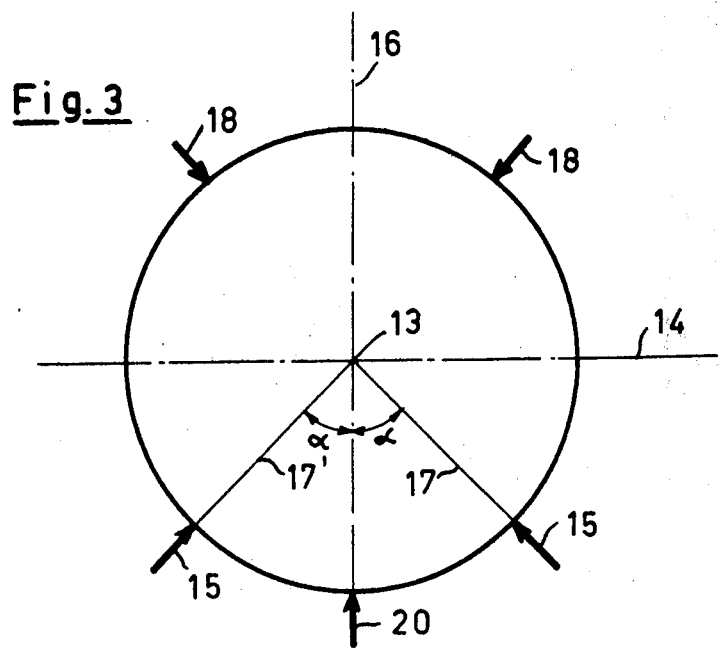
FIG. 3 is a diagram illustrating an external radial support arrangement.

Wheel 2, rim 8 and rotor 9 form a rotating unit which is supported radially by hydrostatic supporting devices which cooperate with the outer peripheral surface of each of a pair of coaxial rings 40 which extend in the axial direction from opposite sides of rim 8. FIG. 3 shows one way in which the supporting devices indicated symbolically by arrows, associated with each ring 40 may be arranged. As shown in this Figure, the supporting scheme includes two hydrostatic centering supporting devices 15 which are located below the horizontal plane 14 containing axis 13 and are arranged symmetrically with respect to the central vertical plane 16 containing that axis. The axes of these devices 15 are inclined relatively to plane 16 at an angle α on the order of 40°-70°. Each of these devices 15 includes a displaceable supporting piston which acts on ring 40 without physical contact and furnishes a supporting force which increases as the ring 40 approaches and decreases as the ring moves in the opposite direction. The supporting scheme also includes two hydrostatic damping devices 18 which are located above horizontal plane 14 and are inclined and arranged symmetrically with respect to vertical plane 16. Each of the devices 18 also includes a displaceable supporting piston which bears on ring 40 without physical contact, but, under normal conditions, it furnishes a constant, relatively small supporting force which is not affected by slow radial movements of the ring. However, when the rotating unit, and consequently the ring 40, is suddenly displaced toward a device 18, the device furnishes an increased reaction. Finally, the FIG. 3 support arrangement may, if desired, include a hydrostatic follow-up, load-bearing device 20 which is positioned in vertical plane 16 and below horizontal plane 14. This device, like the others, acts on ring 40 without physical contact, but it serves to accept a constant portion of the weight of the rotating unit.

The centering supporting devices 15 serve to hold the rotating unit centered with respect to axis 13 during normal operation, and also to transmit to the machine foundation a portion or all of the weight of the rotating unit. Thus, these devices are true bearings. The damping supporting devices 18, on the other hand, are not really bearings, because they develop substantial supporting force only when the rotating unit is suddenly displaced by dynamic forces. Thus, these devices serve solely to prevent sudden movement of the rotating unit from its centered position.

Figure 7:
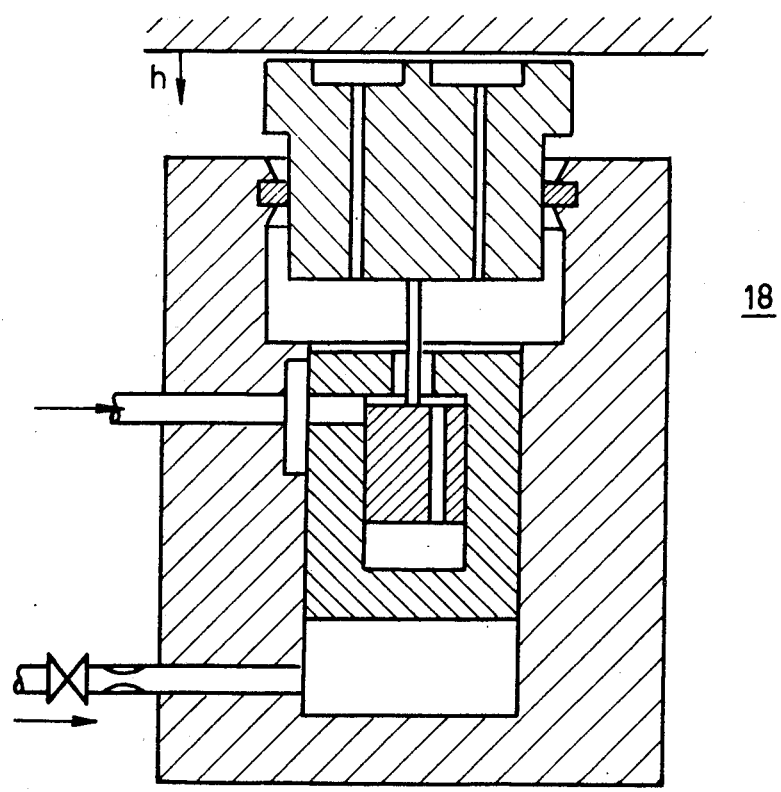
FIG. 7 is a sectional view of a hydrostatic damping supporting device.
Figure 7A:
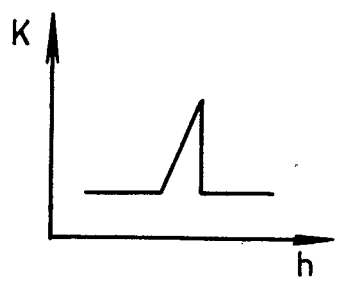
FIG. 7a is the force vs. travel diagram for the supporting device of FIG. 7.

One example of a hydrostatic centering supporting device 15 is shown in FIG. 6, and is described in detail in U.S. Pat. No. 3,994,367 issued Nov. 30, 1976. Other examples of this device are disclosed in U.S. application Ser. No. 744,252 filed concurrently herewith. FIG. 7 shows one version of the hydrostatic damping supporting device 18. This constructional example, as well as several others, are described in detail in U.S. application Ser. No. 744,319 filed concurrently herewith. A constructional example of the hydrostatic loadbearing device 20 is shown in FIG. 8 and is described in detail in U.S. Pat. No. 3,802,044, issued Apr. 9, 1974. The force vs. travel characteristics of the device 15, 18 and 20 are represented in the diagrams of FIGS. 6a, 7a and 8a, respectively.

Figure 2:
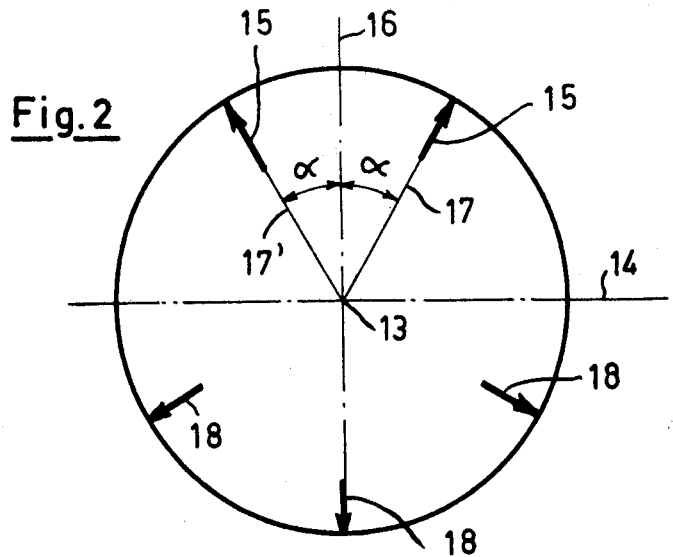
FIG. 2 is a diagram illustrating an internal radial support arrangement.

An alternative radial supporting arrangement for the FIG. 1 embodiment is depicted in FIG. 2. In this scheme, the hydrostatic devices are located inside each of the rings 40 and cooperate with the inner peripheral surface of the associated ring. The FIG. 2 arrangement includes two hydrostatic centering supporting devices 15 which are located above horizontal plane 14 and positioned symmetrically with respect to vertical plane 16. As before, the axes 17 and 17' of these devices are inclined relatively to plane 16 at an angle α on the order of 40°-70°. At the opposite side of horizontal plane 14, the alternative embodiment provides three hydrostatic damping supporting devices 18, two of which are arranged symmetrically with respect to vertical plane 16, and the third of which is centered in that plane. If desired, a third centering supporting device 15 could be provided in the vertical plane 16 between the two illustrated devices 15. The hydrostatic devices in FIG. 2 perform the same functions as their counterparts in FIG. 3; however, since the FIG. 2 embodiment does not include a hydrostatic load-bearing device 20, the entire weight of the rotating unit must be carried by the centering supporting devices 15.

It might be remarked here that the various radial supporting arrangements may employ a plurality of each of the devices 15, 18 and 20, with like devices being arranged in a row in the axial direction.

In normal operation, the rotating unit 2, 8, 9 of FIG. 1 is subjected to an axial thrust which urges it toward the right in the drawing. This thrust is accepted by at least two hydrostatic centering supporting devices 15' which are distributed around axis 13 and bear without contact on the end of the ring 40 at the low pressure side of the rotating unit. Since there is a possibility that the axial thrust acting on the rotating unit will be reversed when the electrical machine is switched off, the FIG. 1 embodiment also includes means which hydrostatically restrains that unit against sudden movement to the left. This means comprises at least two hydrostatic damping devices 18' which are distributed around axis 13 and act, without physical contact, on the end of the ring 40 which is at what is normally the high pressure side of the rotating unit. These axial supporting devices 15' and 18' may be constructed in exactly the same way as the radial supporting devices 15 and 18, respectively.

Figure 4:
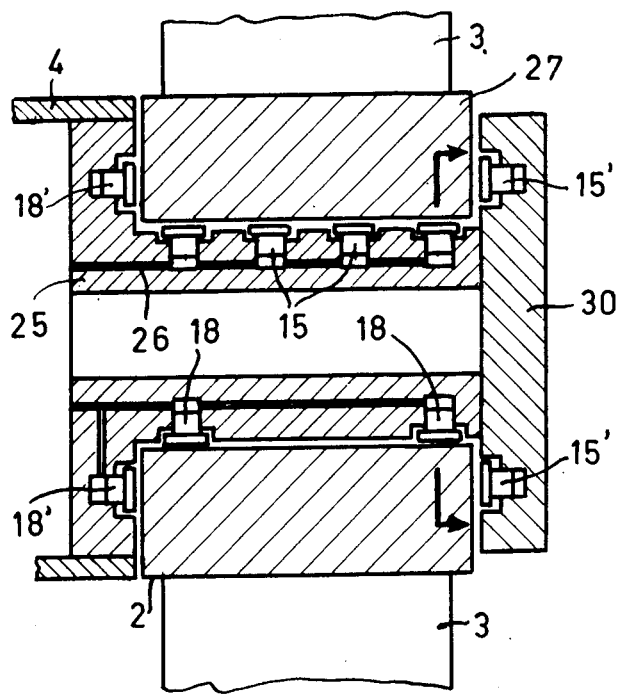
FIG. 4 is an axial sectional view of a support arrangement applied to the hub of the bladed wheel.
Figure 5:
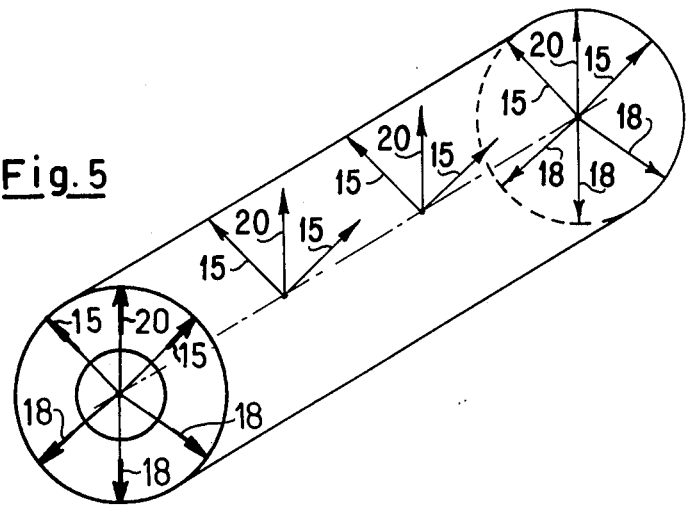
FIG. 5 is a diagram illustrating the arrangement of the radial supporting devices employed in FIG. 4.

FIGS. 4 and 5 illustrate an embodiment in which the rotating unit of the hydroelectric machine is supported by hydrostatic devices which react between the hub of bladed wheel 2 and a supporting journal 25 which is secured to the incident flow control element 4. Main radial support here is provided by two sets of centering supporting devices 15 which are positioned relatively to the central horizontal and vertical planes in the same way as the devices 15 of FIG. 2, and by a set of load-bearing devices 20 which is located between the sets of devices 15 on the central vertical plane. Each of these three sets contains four hydrostatic supporting devices of the same type arranged in a row in the axial direction and provided with a common pressure medium conduit. The common conduit 26 for one set of the centering supporting devices 15 appears in FIG. 4. The radial supporting scheme also includes three sets of hydrostatic damping supporting devices 18 which are located below the central horizontal plane and are arranged in the same way as their FIG. 2 counterparts. Each of these sets contains two devices of the same type aligned in a row in the axial direction and provided with a common pressure medium conduit.

As is the case of the FIG. 1 embodiment, axial thrusts in the FIG. 4 embodiment are accepted hydrostatically. However, here the centering supporting devices 15' which provide the normal supporting force react between the downstream face of the wheel hub and a disc 30 which is attached by screws (not shown) to journal 25, and the damping supporting devices 18' which provide the necessary reaction to reverse thrusts are interposed between the upstream face of the hub and a flange of the supporting journal.

The hydrostatic devices 15, 18 and 20 employed in the FIG. 4 embodiment perform the same supporting functions as the corresponding devices of the other embodiments and, of course, act on the rotating unit without physical contact.

The final embodiment, illustrated in FIG. 9, is similar to the first, in that the rotating unit is supported in the region of the rim 8. However, this version of the invention uses the internal radial support arrangement of FIG. 2, rather than the external arrangement of FIG. 3. The internal bearing scheme is generally more desirable in the case of machines having rotors of relatively large diameter because it requires smaller supporting forces. It also will be noted that, in contrast to the machine of FIG. 1, the one depicted in FIG. 9 has a rotor 9 which is axially displaced to the right relatively to the rim 8 so that the centers of gravity of the two parts do not lie in the same radial plane. Because of this, the FIG. 9 machine employs only the ring 40, with the associated hydrostatic supporting devices, at the low pressure side of the rotating unit.

I claim:

1. A hydroelectric machine including
   a. a tube-type hydraulic machine having a bladed wheel which rotates about a horizontal axis and includes fixed, radially extending blades;
   b. an annular rim surrounding the bladed wheel and secured to the blades at their outer ends;
   c. an electrical machine surrounding the rim and having a rotor attached to the rim,
   d. the rotor, rim and bladed wheel forming a single rotating unit;
   e. an annular bearing surface on said rotating unit;
   f. at least two hydrostatic centering supporting devices, each of which includes a piston which is positioned by an hydraulic support motor and which cooperates with the annular bearing surface to radially support said unit without physical contact,
   g. the centering supporting devices being in two regions at one side of the horizontal plane containing the axis of rotation, being inclined and positioned symmetrically with respect to the vertical plane containing said axis, having an angle of inclination not greater than 40° to 70°, and providing supporting forces which increase and decrease, respectively, as the bearing surface approaches and retreats from the associated pistons; and
   h. at least one hydrostatic damping supporting device including a piston which is positioned by an hydraulic support motor and which cooperates with the bearing surface to provide radial support for said unit without physical contact under dynamic loading conditions,
   i. the damping supporting device being located at the opposite side of said horizontal plane from the centering supporting devices and furnishing a supporting force which acts in a direction opposite to the resultant of the forces supplied by the centering supporting devices and has a magnitude which normally is constant and relatively small but increases materially when the bearing surface suddenly moves toward its piston.

2. A machine as defined in claim 1 in which
   a. there is at least one of said hydrostatic damping supporting devices in each of two regions at said opposite side of the horizontal plane, and these regions are located symmetrically with respect to said vertical plane;
   b. the damping supporting devices are inclined with respect to said vertical plane; and
   c. the resultant of the supporting forces supplied by the damping supporting devices acts in a direction opposite to the resultant of the supporting forces supplied by the centering supporting devices.

3. A machine as defined in claim 2 in which there are a plurality of said damping supporting devices arranged in a row in the axial direction in each of said regions at the opposite side of the horizontal plane.

4. A machine as defined in claim 1 including at least one hydrostatic load-bearing device located at the same side of said horizontal plane as the centering supporting devices, and having a piston which is positioned by an hydraulic support motor and which cooperates with said annular surface and accepts without physical contact a constant portion of the weight of said rotating unit.

5. A machine as defined in claim 4 in which there are a plurality of said load-bearing devices, and these devices are arranged so that the resultant of their supporting forces acts in said vertical plane.

6. A machine as defined in claim 5 in which said load-bearing devices are arranged in a row in said vertical plane.

7. A machine as defined in claim 1 in which
   a. there are a plurality of said centering supporting devices arranged in a row in the axial direction in each of said regions; and
   b. there are a plurality of said damping supporting devices arranged in a row in the axial direction.

8. A machine as defined in claim 1 in which
   a. the rim includes a coaxial ring which projects therefrom in the axial direction and has inner and outer peripheral surfaces; and
   b. one of said inner and outer peripheral surfaces serves as said annular bearing surface.

9. A machine as defined in claim 8 in which
   a. the outer peripheral surface serves as said annular bearing surface;

b. the supporting devices are located radially outside the ring; and c. the centering and damping supporting devices are located, respectively, below and above said horizontal plane.

10. A machine as defined in claim 8 in which a. the inner peripheral surface serves as said annular bearing surface;

b. the supporting devices are located radially inside the ring; and c. the centering and damping supporting devices are located, respectively, above and below said horizontal plane.

11. A machine as defined in claim 8 in which a. the center of gravity of the rotor is offset axially from the center of gravity of the rim in the direction of said ring; and b. all radial support for the rotating unit is applied through one of said surfaces of the ring.

12. A machine as defined in claim 1 in which a. the rim includes a pair of coaxial rings which project axially therefrom in opposite directions and each of which has inner and outer peripheral surfaces;

b. one of said peripheral surfaces of each ring serves as an annular bearing surface for the rotating unit; and c. each annular bearing surface cooperates with a set of said centering and damping supporting devices.

13. A machine as defined in claim 1 in which a. the bladed wheel has a hub which rotates on a stationary journal and has an internal surface which serves as said annular bearing surface;

b. the supporting devices are mounted on the journal; and c. the centering and damping supporting devices are positioned, respectively, above and below said horizontal plane.

14. A machine as defined in claim 1 in which, in normal operation, the bladed wheel has a high pressure side and a low pressure side, and the pressure differential develops an axial thrust which urges the rotating unit toward the low pressure side; and which includes a. at least two circumferentially spaced hydrostatic centering supporting devices located at said low pressure side and each of which includes a piston which is positioned by an hydraulic support motor and which cooperates with an end surface of the rotating unit to provide axial support without physical contact, b. these centering supporting devices providing axially directed forces which increase and decrease, respectively, as the rotating unit moves toward and away from said low pressure side.

15. A machine as defined in claim 14 in which the rotating unit is, at times, subjected to a reverse axial thrust which urges it toward said high pressure side; and which includes a. at least two circumferentially spaced hydrostatic damping supporting devices located at said high pressure side and each of which includes a piston which is positioned by an hydraulic support motor and which cooperates with an opposite end surface of the rotating unit to provide axial support without physical contact, b. these damping supporting devices exerting axial forces which normally are constant and relatively small but increase materially when the rotating unit suddenly is moved toward said high pressure side by the reverse axial thrust.

* * * * *